Patented Nov. 15, 1938

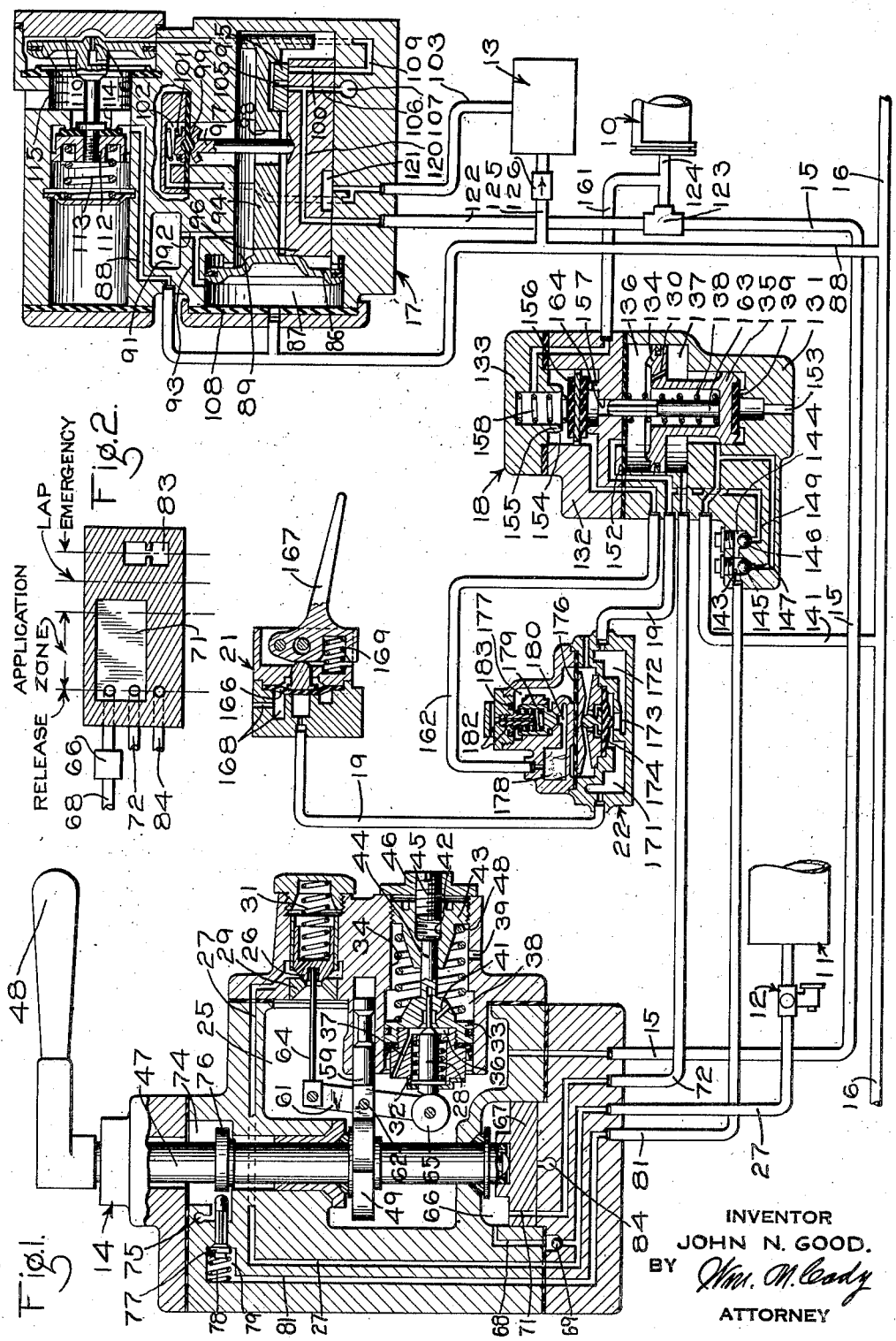

2,137,017

UNITED STATES PATENT OFFICE 2,137,017

FLUID PRESSURE BRAKE

John N. Good, Wilmerding, Pa., assignor to The Westinghouse Air Brake Company, Wilmerding, Pa., a corporation of Pennsylvania Application August 24, 1937, Serial No. 160,560

14 Claims. (Cl. 303—19)

This application relates to fluid pressure brakes and has particular relation to fluid pressure brake equipment wherein a safety control or deadman application is automatically suppressed when the brakes are applied with a braking force in excess of a certain uniform degree.

Vehicles, such as railway cars or trains, are commonly provided with a fluid pressure brake equipment including a foot-operated valve device and a hand-operated valve device adapted when pressure manually applied to each is simultaneously released, as upon incapacitation of the operator, to reduce the pressure in a so-called safety control pipe and thereby cause a so-called "deadman" emergency application of the brakes. In order to suppress a deadman application of the brakes, a cut-off valve device is commonly provided to prevent reduction of the pressure in the safety control pipe when the brake cylinder pressure established during a normal application exceeds a certain pressure, thus enabling the operator to release the manually applied pressure on both the hand-operated and the foot-operated valve devices without causing a deadman emergency application of the brakes. However, unless some means is provided for preventing operation of the cut-off valve device, when a deadman emergency application of the brakes is effected, the cut-off valve device will operate at a predetermined brake cylinder pressure, just as in a normal application of the brakes, to terminate venting of the safety control pipe and permit it to become recharged sufficiently to produce an undesired and premature release of the brakes.

It is accordingly an object of my present invention to provide novel means for suppressing or preventing operation of the cut-off valve device in a deadman emergency application of the brakes in order to insure that the full degree of the application will be realized without a premature and undesired release thereof.

More specifically, it is an object of my invention to provide a novel type of valve device which is adapted to be operated either under the control of deadman devices or under the usual manual control of the operator, to effect an emergency application of the brakes, as well as to prevent operation of the cut-off valve device in the safety control pipe in case of a deadman application of the brakes.

The above objects, and other objects of my invention which will be made apparent hereinafter, are attained by an illustrative embodiment of my invention subsequently to be described and shown in the accompanying drawing, wherein Fig. 1 is a diagrammatic simplified view illustrating one embodiment of my invention, and Fig. 2 is a diagrammatic view indicating the various connections established by the rotary valve of the brake valve device shown in Fig. 1.

Description of equipment

The equipment shown in Fig. 1 comprises a brake cylinder 10, a main reservoir 11, a feed valve device 12 of well known construction for regulating the pressure as supplied from the main reservoir 11, an emergency reservoir 13, a brake valve device 14 of the self-lapping type adapted to control the supply of fluid under pressure from the main reservoir 11 to a straight-air pipe 15 and also to effect reduction in the pressure in a brake pipe 16 for effecting service and emergency applications of the brakes, respectively. The equipment further includes an emergency valve device 17 operated upon an emergency reduction of the pressure in the brake pipe 16 to effect the supply of fluid under pressure from the emergency reservoir 13 to the brake cylinder 10, and, according to my invention, a vent valve device 18 operative to effect an emergency reduction of the pressure in the brake pipe 16 under the control of the brake valve device 14.

The vent valve device 18 is also operative to effect an emergency reduction of the pressure in the brake pipe 16 upon a reduction of pressure in a safety control pipe 19 as caused by a deadman device in the form of a foot-operated valve device 21, a cut-off valve device 22 of standard construction being provided in the safety control pipe 19 to prevent reduction of the pressure in the safety control pipe when the brake cylinder pressure exceeds a certain pressure.

Considering the parts of the equipment in greater detail, the brake valve device 14 comprises a casing having a chamber 25 hereinafter referred to as the pressure chamber, to which the straight-air pipe 15 is constantly connected, the pressure of the fluid in the pressure chamber 25 being controlled by operation of a supply valve 26 which controls the supply of fluid under pressure to the chamber 25 from a feed valve pipe and passage 27 leading from the feed valve device 12, and a release valve 28 for effecting the release of fluid under pressure from the chamber 25.

The supply valve 26 is in the form of a valve piston slidably mounted in the casing and yieldingly urged into seated relation on an annular seat ring 29 by a spring 31.

The release valve 28 is in the form of a pin valve which is yieldingly unseated by a spring 32 from an associated valve seat on a piston 33 that in turn operates in a bore 34 in the casing. Formed in the piston 33 is a chamber 36 which communicates through a passage 37 in the piston 33 with the pressure chamber 25 and through a passage and port 41 with a chamber 38 located on the side of the piston opposite to the pressure chamber 25 and constantly open to atmosphere through an exhaust port 39.

Screwed into the outer threaded portion of the bore 34 is a plug 43 which has an axial bore 42 therein that is provided with a smooth inner portion for slidably receiving the outer end of a stem 44 of the piston 33 in supporting and guiding relation. Received in the outer threaded portion of the bore 42 of the plug 43 is a stop screw 45 which is adapted to be engaged by the outer end of stem 44 of the piston 33 to limit the movement of the piston 33 outwardly of the bore 34. A lock nut 46 is provided on the screw 45 to prevent accidental or undesired variation in the adjustment of the screw 45.

Interposed between the piston 33 and the plug 43 is a regulating spring 48 which yielding urges the piston 33 inwardly of the bore 34 toward the pressure chamber 25.

Operation of the supply valve 26 and the release valve 28 is effected by means of a rotary shaft 47 which is suitably journaled in the casing and which has fixed thereto at a point exterior of the casing an operating handle 48 for manually rotating the shaft. The rotary shaft 47 extends into the pressure chamber 25 and has fixed thereto within the chamber 25 a cam 49 which is adapted to cause movement of a suitable plunger 59 which operates slidably in a bore in the casing. A lever 61 is pivotally mounted, at a point intermediate its ends, on the plunger 59 by a pin 62. A stem 64 pivotally connected to one end of the lever 61 has its free end received in a recess formed in the face of the supply valve 26 at the inner seated area thereof. A roller 65 is mounted at the opposite end of the lever 61 for engaging the inner end of the release valve 28 which projects into the pressure chamber 25.

Also formed in the casing of the brake valve device 14 is a rotary valve chamber 66 in which is contained a rotary valve 67, the valve 67 seating on an associated valve seat and being interlocked with the rotary shaft 47 so as to rotate therewith. The rotary valve chamber 66 is charged with fluid under pressure from the feed valve pipe and passage 27 through a branch passage 68 containing a ball check valve 69 adapted to prevent back flow of fluid under pressure from the chamber 66 to the passage 27. As shown in both Figs. 1 and 2, when the operating handle 48 of the brake valve 14 is in the brake release position, the rotary valve 67 is positioned so as to establish communication through a part 71 in the rotary valve from the rotary valve chamber 66 to a passage and pipe 72 leading to the vent valve device 18 and hereinafter referred to as the charging pipe.

Fixed to the rotary shaft 47 within a chamber 74, constantly open to atmosphere through an exhaust port 75, is a cam 76 which is effective to unseat a poppet valve 77, yieldingly urged to a seated position by a spring 78, when the handle 48 of the brake valve device is shifted to emergency position. The valve 77 is contained in a chamber 79 to which is constantly connected a pipe and passage 81, hereinafter referred to as the emergency pipe. When the poppet valve 77 is unseated, communication is established past the valve 77 from the emergency pipe and passage 81 to the atmospheric chamber 74 to effect a reduction of the pressure in emergency pipe 81.

As shown in Fig. 2, the rotary valve 67 is adapted to maintain the charging communication through the port 71 from chamber 66 to the charging pipe 72 when the handle 48 of the brake valve device 14 is shifted out of its normal brake release position through a given angle hereinafter referred to as the application zone. When the handle 48 is shifted through the application zone and beyond successively into lap and emergency positions, the charging communication from the chamber 66 to the charging pipe 72 is cut off or lapped. As further indicated in Fig. 2, the rotary valve 67 is provided with a restricted port 83 which is effective when the handle 48 of the brake valve device is in emergency position, to connect the charging pipe 72 to an atmospheric exhaust port 84 opening at the seat of the rotary valve 67.

The cam surface of cam 49 on the rotary shaft 47 increases in eccentricity correspondingly as the angle of movement of operating handle 48 from release position into the application zone increases, the cam surface has a "dwell" portion of uniform eccentricity so that rotation of the operating handle 48 when beyond the application zone, is ineffective to further shift the plunger 59 in the right-hand direction, as viewed in Fig. 1, until such time as the operating handle reaches emergency position at which time the cam surface 49 again increases in eccentricity sufficiently to shift the plunger 59 the maximum degree in the right-hand direction.

The operation of the brake valve device 14 is as follows:

The spring 31 urging the supply valve 26 to seated position is stronger than the spring 32 urging the release valve 28 to unseated position and, thus, when the brake valve handle 48 is rotated into the application zone from the release position, to cause the plunger 59 to be shifted in the right-hand direction, the lever 61 is pivoted in a counterclockwise direction, about its upper end and effects seating of the release valve 28 on the piston 33. The spring 48 is stronger than the spring 31 and thus when the release valve 28 seats, the lever 61 is pivoted in a clockwise direction about its lower end and, through the stem 64, causes the supply valve 26 to be unseated to admit fluid under pressure from the feed valve pipe and passage 27 to the pressure chamber 25.

When the pressure of the fluid in the pressure chamber 25 acting on the inner face of the piston 33 increases sufficiently to overcome the tension of the spring 48, the piston 33 is shifted outwardly of the bore 34 and the spring 31 then becomes effective to reseat the supply valve 26 while maintaining the release valve 28 seated. Since the further supply of fluid under pressure to the pressure chamber 25 is cut off when the supply valve 26 seats, the piston 33 stops immediately and thus both the supply valve 26 and the release valve 28 remain seated.

If the brake valve handle 48 is shifted a further degree into the application zone from the release position, the supply valve 26 is again unseated to further admit fluid under pressure into the pressure chamber 25, the supply valve 26 being reseated again when the pressure in the pressure chamber 25 increases sufficiently to shift the piston 33 outwardly of the bore 34 to cause reseating of the supply valve. It will thus be apparent that the degree of pressure established in the pressure chamber 25 increases correspondingly as the brake valve handle 48 is shifted from the release position into the application zone.

Since the cam surface of cam 49 on the rotary shaft 47 of the brake valve device 14 has a "dwell" surface thereon as previously described, no movement of the plunger 59 in the right-hand direction and, consequently, no increase in the pressure in the pressure chamber 25 is effected as the brake valve handle 48 is shifted a further degree out of release position while beyond the application zone.

When the brake valve handle 48 is shifted to emergency position, however, the plunger 59 is shifted a further degree in the right-hand direction so that the increased pressure established in the pressure chamber 25 shifts the piston 33 in the right-hand direction sufficiently outwardly of the bore 34 to cause the stem 44 of the piston to engage the stop screw 45. Thus, regardless of the further increase of pressure in the pressure chamber 25, the supply valve 26 cannot be reseated and the pressure in the pressure chamber 25 accordingly builds up to the maximum pressure as supplied from the feed valve 12 through the feed valve pipe 27.

To effect a partial release of the brakes, the operator shifts the brake valve handle 48 back toward release position. The force exerted by the cam 49 on the plunger 59 is thus relieved and spring 32 unseats release valve 28 to cause fluid under pressure to be exhausted from the pressure chamber 25 to atmosphere through the exhaust port 39. As the pressure of the fluid in the pressure chamber 25 reduces, the spring 48 shifts the piston 33 inwardly of the bore 34. If the brake valve handle 48 is positioned in the application zone, the piston 33 causes the release valve 28 to be reseated when the pressure in the pressure chamber 25 corresponds to the position of the brake valve handle.

To effect complete release of the brakes, the operator returns the brake valve handle 48 to release position. The release valve 28 is thus unseated and the fluid under pressure is exhausted from the pressure chamber 25 to atmosphere through the exhaust port 39. The spring 48, however, is ineffective to reseat the release valve 28 with the brake valve handle 48 in release position and thus the pressure in the pressure chamber 25 is reduced to atmospheric pressure.

The emergency valve device 17 comprises a casing containing a piston 86 having at one side a chamber 87 hereinafter called the piston chamber, which is constantly connected to the brake pipe through a branch pipe 88, and having at the opposite side a slide valve chamber 89 to which a quick action chamber 91 is connected through a passage 92. A branch passage 93 of the passage 92 is uncovered by the piston 86 when in its extreme right-hand position as shown to establish a charging communication from the piston chamber 87 to the slide valve chamber 89 and connected quick action chamber 91.

The piston 86 is provided with a stem 94 which is recessed to receive and move coextensive therewith a graduating valve 95 and with a certain degree of lost motion also a main slide valve 96.

The main slide valve 96 is held upon its associated seat by a holding pin 97 which extends through an opening 98 in the stem 94 and engages in a recess formed in the upper face of the main slide valve. The holding pin 97 is suitably fixed to a diaphragm 99 which is subject at the upper side thereof to the force of a spring 101 and the pressure of fluid in a chamber 102 which is constantly connected to the emergency reservoir 13 through a passage and pipe 103.

When the pressure in the brake pipe 16 and thus in the piston chamber 87 of the emergency valve device 17 is reduced at a service rate, the higher pressure in the slide valve chamber 89 and quick action chamber 91 is effective to shift the piston in the left-hand direction to close the connection from the piston chamber 87 to the quick action chamber 91 and slide valve chamber 89 through the branch passage 93, the graduating valve 95 being simultaneously moved to a position in which a port 105 therein registers with an exhaust port or passage 107 opening at the seat of the main slide valve. The port 105 is of such size that the pressure of the fluid in the slide valve chamber 89 and quick action chamber 91 is reduced at a sufficiently rapid rate to arrest further movement of the piston 86 in the left-hand direction. Thus fluid under pressure continues to be released through the exhaust port 107 from the slide valve chamber and quick action chamber to atmosphere until the pressure in the chambers is slightly overbalanced by the pressure in the piston chamber 87, at which time the piston is shifted back to its release position, shown in the drawing, wherein the graduating valve 95 laps the port 106 in the main slide valve and cuts off the further release of fluid under pressure from the slide valve chamber and quick action chamber. It will thus be seen that for service reductions in brake pipe pressure, the main slide valve 96 in effect remains in release position and is not shifted therefrom.

The main slide valve 96 is provided with a port 100 which in the release position shown in the drawing registers with a passage 109 leading to a piston chamber 110 of a vent valve device. Upon an emergency reduction of brake pipe pressure, the graduating valve 95 is shifted to uncover the port 100 and thus cause fluid under pressure to be supplied from slide valve chamber 89 to the piston chamber 110. Contained in the piston chamber 110 is a piston 111 which when subject to the pressure of fluid supplied from the slide valve chamber 89 through the passage 109 unseats a vent valve 112 against the yielding resistance of a spring 113 which normally urges the vent valve 112 into seated relation on an associated annular rib seat. When the vent valve 112 is unseated it establishes communication through a passage or port 114 from the branch pipe and passage 88 of the brake pipe to an atmospheric chamber and passage 115 to effect a rapid reduction of pressure in the brake pipe. The brake pipe is thus reduced substantially to atmospheric pressure and, therefore, shifting of the piston 86 of the emergency valve device to its extreme left-hand position in seated engagement on a gasket 108 is assured. Ultimately, the pressure of the fluid supplied from the slide valve chamber 89 and quick action chamber 91 escapes through a restricted port and passage 116 in the piston 111 to the atmospheric chamber 115 and the spring 113 then becomes effective to reseat the vent valve 112. With the piston 86 in seated engagement with the gasket 108 a cavity 121 in the main slide valve 96 establishes communication between the pipe and passage 103 connected to the emergency reservoir 13 and a passage and pipe 122 leading to the brake cylinder 10 to cause fluid under pressure to be supplied to the brake cylinder 10 to effect application of the brakes.

When the main slide valve 96 is in its release position, the port 106 and a branch passage 120 thereof connect the passage and pipe 122 to the atmospheric exhaust passage 107 so that fluid under pressure may be released from the brake cylinder.

The double check valve 123 is of well known construction and may comprise a piston valve (not shown) subject on the opposite ends thereof to pressure in the straight air pipe 15 and pipe 122, respectively, and shiftable between two opposite positions to establish communication from either the straight air pipe 15 or the pipe 122 to a pipe 124 leading to the brake cylinder 10, in response to the predominating pressure in straight-air pipe 15 or the pipe 122.

The emergency reservoir 13 is charged with fluid under pressure from the brake pipe 16 through a branch pipe 125 of the pipe 88, the pipe 125 including a one-way or check valve 126 for preventing back flow of fluid under pressure from the emergency reservoir to the pipe 88.

The vent valve device 18, which is one of the features of my invention, comprises a casing having a vent valve section 131, a check valve section 132 and a cover section 133, suitably joined in sealed relation. Contained in the casing section 131 is a piston 134 for operating a vent valve 135. At one side of the piston 134 is a chamber 136 to which the safety control pipe and passage 19 is constantly connected and at the opposite side is an annular chamber 137 to which the charging pipe and passage 72 is constantly connected, the chamber 136 and safety control pipe 19 being charged with fluid under pressure through a restricted port 130 in the piston 134. When the fluid pressure on opposite sides of the piston 134 is equalized, a spring 138 interposed in the chamber 136 between the piston 134 and the casing section 132 yieldingly urges the piston downwardly to cause the vent valve 135 to seat on an associated annular rib seat 139. When seated on the annular rib seat 139, the vent valve 135 uncovers a branch passage and pipe 141 of the brake pipe 16 which opens into the annular chamber 137, thus establishing communication through which the brake pipe 16 is charged with fluid under pressure from the charging pipe 72.

Two connected chambers 143 and 144 to which the emergency pipe and passage 81 are connected are provided in the casing section 131, the chamber 143 being connected to the passage 141 through a passage 147 and the chamber 144 being connected to the safety control passage 19 through a passage 149. Passage 147 is of smaller flow area than passage 149, as indicated by the restricted portion thereof, so that fluid under pressure flows therethrough at a slower rate, for a reason which will be hereinafter made apparent. Ball check valves 145 and 146 are contained in the chambers 143 and 144, respectively, the arrangement of the ball check valve 145 being such as to prevent flow of fluid under pressure from the emergency pipe 81 to the branch pipe and passage 141 and the arrangement of the ball check valve 146 being such as to prevent flow of fluid under pressure from the emergency pipe 81 to the safety control pipe and passage 19.

As will be explained more clearly hereinafter, the vent valve piston 134 is shifted upwardly, upon a reduction of the pressure in the safety control pipe 19 or of the pressure in the emergency pipe 81, into seated engagement on a gasket 152, the vent valve 135 being correspondingly shifted upwardly and unseated from the annular rib seat 139. With the vent valve piston 134 seated on the gasket 152, the vent valve 135 cuts off the connection from the branch pipe and passage 141 of the brake pipe 16 to the annular chamber 137 and the connected charging pipe 72 and establishes communication from the branch pipe and passage 141 to atmosphere through a relatively large exhaust port 153, thereby effecting a rapid emergency reduction in brake pipe pressure.

Contained in the casing section 132 of the vent valve device 18 is a chamber 154, the open end of which is closed by the cover section 133 on the inner face of which is formed an annular rib seat 155. Contained in the chamber 154 is a check valve 156 of the disc type, having a fluted metallic insert whereby the valve is suitably guided in the chamber 154, and normally yieldingly urged into seated relation on an annular rib seat 157 formed on the casing section 132 by a spring 158 that is interposed between the cover section 133 and the check valve 156.

The piston 134 is provided with a stem 163 fixed thereto and having a fluted portion at the upper end thereof which is guided in a suitable bore 164 which opens to the inner seated area of the check valve 156 when seated on the annular rib seat 157. When the piston 134 is shifted downwardly by the spring 138 to seat the vent valve 135 on the annular rib seat 139, the stem 163 is lowered sufficiently to permit the spring 158 to seat the check valve 156 on the annular rib seat 157. When the piston 134 is shifted upwardly into seated relation on the gasket 152, however, the stem 164 engages the check valve 156 at the inner seated area thereof and shifts it upwardly into seated engagement on the annular rib seat 155 thus cutting off communication between a pipe and passage 161, that is connected to the brake cylinder pipe 124, and a passage and pipe 162 leading to the cut-off valve device 22. At the same time, check valve 156 establishes communication from the pipe and passage 162 and chamber 154 past the annular rib seat 157 and through the port 164 to the chamber 136 and connected safety control pipe and passage 19. The purpose of this operation of the check valve 156 will be made clear later.

The foot valve device 21 may be of any suitable construction and is illustrated as comprising a casing having a diaphragm valve 166 which is actuated into seated engagement on an associated annular valve seat, when a pivoted foot pedal 167 is depressed, to cut off the communication between the safety control pipe 19 and an atmospheric passage and port 168. When the manually applied pressure depressing the foot pedal 167 is relieved, a spring 169 shifts the foot pedal 167 upwardly and thus, due to its inherent resiliency, the diaphragm valve 166 unseats and establishes communication from the safety control pipe 19 to the atmospheric passage 168 to effect the exhaust of fluid under pressure from the safety control pipe 19.

The cut-off valve 22 comprises a casing having a chamber 171 to which one portion of the safety control pipe 19 leading to the foot valve device 21 is connected and a chamber 172 to which the other portion of the safety control pipe 19 leading to the vent valve device 18 is connected, the chambers 171 and 172 being connected by a port 173 which is controlled by a diaphragm valve 174. Due to its inherent resiliency, the diaphragm valve 174 is normally unseated and establishes communication between the chambers 171 and 172.

The diaphragm valve 174 is operated by a diaphragm 176 which is effective when subject to the pressure of fluid in a chamber 177 at one side thereof to shift the diaphragm valve 174, through the medium of suitable followers, into seated engagement on its associated seat to close the connection between the chambers 171 and 172 through the port 173.

Also formed in the casing of the cut-off valve device 22 is a chamber 178 to which the pipe 162 leading from the vent valve device 18 is connected. A spring loaded valve piston 179 controls communication between chamber 178 and the chamber 177 through a port 180 to prevent the supply of fluid under pressure from the pipe 162 to the chamber 177 until the pressure in the chamber 178 and acting to unseat the valve piston 179 exceeds a certain uniform pressure. When the spring-loaded valve piston 179 is seated on its associated valve seat, it establishes communication between the chamber 177 and atmosphere through a passage and port 182. When the pressure of the fluid supplied to the chamber 178 exceeds a certain uniform pressure sufficient to overcome the force of the loading spring of the valve piston 179, the valve piston 179 is unseated and being suddenly subjected to fluid under pressure over an increased area is snapped suddenly upward into seated engagement on an annular gasket seat 183 to cut off the connection from the chamber 177 to atmosphere through the exhaust passage and port 182, while at the same time establishing communication from the pipe 162 and chamber 178 to the chamber 177.

It should now be apparent that with the check valve 156 of the vent valve device 18 in its lower seated position as shown, communication is established from the brake cylinder 10 to chamber 178 of the cut-off valve device 22 so that when the pressure in the brake cylinder exceeds a certain uniform pressure, valve piston 179 of the cut-off valve device 22 will be unseated and the brake cylinder pressure acting in chamber 177 on the diaphragm 176 thus causes the diaphragm valve 174 to be actuated to seated position to close the connection through the port 173 between the chambers 171 and 172. Since the cut-off valve device 22 is interposed in the safety control pipe 19 between the foot valve device 21 and the vent valve device 18 it will be apparent that the seating of the diaphragm valve 174 of the cut-off valve device 22 renders the foot valve device 21 non-effective to cause operation of the vent valve device 18 upon release of the pressure manually applied to the foot pedal 167.

OPERATION OF EQUIPMENT (a) *Charging*

Assuming the main reservoir 11 to be charged to the normal pressure carried therein as from a fluid compressor, not shown, and that the foot pedal 167 of foot valve device 21 is depressed, the brake pipe 16 is charged to the pressure as regulated by the feed valve device 12 through pipe and passage 27, past the check valve 69, passage 68, rotary valve chamber 66 of the brake valve device 14, port 71 of the rotary valve 67 charging passage and pipe 72, annular chamber 137 of the vent valve device 18 and branch passage and pipe 141. With the foot pedal 167 of the foot valve device 21 depressed, safety control pipe 19 and chamber 136 at the upper side of the vent valve piston 134 are charged, through the port 130 in the piston, to the pressure established in the charging pipe 72. Thus, the vent valve piston 134 is actuated by the spring 138 to seat the vent valve 135 and establish the charging communication from the charging pipe 72 to the branch pipe and passage 141 of the brake pipe. Fluid under pressure also flows from the charging pipe 72 and annular chamber 137 to the emergency pipe and passage 81 and the connected chamber 79 in the brake valve device 14, by way of the passage 147 and past the check valve 145.

With the brake pipe 15 charged to the normal pressure carried therein, the piston 86 of the emergency valve device 17 is shifted to its extreme right-hand position as shown in the drawings, and the emergency reservoir 13 is charged with fluid under pressure by way of the branch pipes 88 and 125 and one way valve 126.

With the main slide valve 96 thus in release position, pipe 122 is connected to atmosphere by way of the passage 120 and port 106 and exhaust port 107. At the same time, with the brake valve handle 48 in release position, the straight-air pipe 15 is connected to atmosphere through the exhaust port 39 of the brake valve device 14 and brake cylinder pressure is reduced to atmospheric pressure, so that the brakes are released.

(b) *Service application*

If the operator desires to effect a service application of the brakes, assuming that he maintains the foot pedal 167 of the foot valve device 21 depressed, he may shift the brake valve handle 48 from release position into the application zone to obtain a desired degree of service application. Since the straight-air pipe 15 is always connected to the pressure chamber 25 of the brake valve device 14, the pressure established in the pressure chamber 25 of the brake valve device 14 is also established in the straight-air pipe 15. Fluid under pressure supplied to the straight-air pipe 15 shifts the valve piston, not shown, of the double check valve 123, if not already shifted, to the position for supplying fluid under pressure from the straight-air pipe to the brake cylinder pipe 124 and, thus, fluid pressure is established in the brake cylinder 10 corresponding to the degree to which the brake valve handle 48 is shifted into the application zone.

Since the check valve 156 of the vent valve device 18 is in its lower seated position on the annular rib 157, fluid under pressure is also supplied to the chamber 178 of the cut-off valve device. When the brake cylinder pressure acting in chamber 178 unseats the spring-loaded valve piston 179 of the cut-off valve device 122, the pressure of fluid thus admitted to chamber 177 and acting on the diaphragm 176 causes diaphragm valve 174 to be actuated to close port 173 between the chamber 171 and 172 of the cut-off valve device.

Thus, if the operator establishes at least a certain uniform pressure in the brake cylinder 10, by operation of the brake valve 14, he may remove his foot from the foot pedal 167, or relieve the pressure thereon, without producing a safety control or deadman emergency application of the brakes which will be presently described.

It will be apparent that the operator may graduate the application of the brakes increasingly or decreasingly by shifting the brake valve handle progressively away from the release position or progressively toward the release position.

To effect release of the brakes following a service application, the operator merely shifts the brake valve handle 48 to release position thus reducing the pressure in the pressure chamber 25 and the straight-air pipe 15 to atmospheric pressure so that the pressure in the brake cylinder 10 is also reduced to atmospheric pressure to effect a complete release of the brakes.

(c) *Manual emergency application*

If the operator desires to effect an emergency application of the brakes, he may shift the brake valve handle 48 to the emergency position. In such position of the brake valve handle 48, the self-lapping valves 26 and 28 are operated in the manner, previously described, to establish maximum pressure in the straight-air pipe 15. At the same time, the rotary valve 67 of the brake valve device 14 cuts off the connection from the rotary valve chamber 66 and connected feed valve pipe and passage 27 to the charging pipe 72 and establishes connection from the charging pipe and passage 72 to the exhaust port 84. At the same time, also, the cam 76 on the rotary shaft 47 of the brake valve device 14 unseats the valve 77 so as to effect a rapid reduction of the pressure in the emergency pipe 81.

Upon the reduction of the pressure in the emergency pipe 81, the check valve 146 unseats and fluid under pressure in the chamber 136 above the vent valve piston and in the safety control pipe 19 is thus rapidly vented to atmosphere by way of pasage 149 and the exhaust port 75 at the brake valve 14. Simultaneously, fluid under pressure is also vented at a slower rate from the brake pipe 16 by way of the branch pipe and passage 141, passage 147, past the check valve 145 through the pipe 81 and exhaust port 75. Fluid under pressure is also vented from brake pipe 16 to atmosphere by way of the charging pipe 72, restricted port 83 in rotary valve 67 and exhaust port 84. In view of the rapid rate of flow of fluid under pressure from chamber 136 above the vent valve piston 134 as permitted through the passage 149 compared to the relatively slower rate of flow of fluid under pressure from the brake pipe through passage 147 and restricted port 83, the pressure in chamber 136 reduces more rapidly than the pressure in the chamber 137 below the vent valve piston 134 and, thus, since the fluid under pressure may flow only at a restricted rate from the chamber 137 to the chamber 136 through the port 130 in the piston 134, the momentary higher pressure in the chamber 137 shifts valve piston 134 upwardly into seated engagement on the gasket 152. The vent valve 135 is thus operated to connect branch pipe and passage 141 of the brake pipe to the exhaust port 153 of the vent valve 18 thereby causing a rapid or emergency reduction of the pressure in the brake pipe.

Upon the rapid reduction in brake pipe pressure effected by the vent valve device 18, the emergency valve device 17 is operated, in the manner previously described, to application position to cause fluid under pressure to be supplied from emergency reservoir 13 to the pipe 122 through the cavity 121 in the main slide valve 96, the vent valve 112 of the emergency valve device 17 being simultaneously operated, as previously described, to effect reduction of the brake pipe pressure substantially to atmospheric pressure. With fluid under pressure thus simultaneously supplied to the straight-air pipe 15 and to the pipe 122, the double check valve 123 establishes communication from the straight-air pipe 15, or from the pipe 122, to the brake cylinder pipe 124, depending upon which of the pipes 15 or 122 has the higher pressure established therein. In view of the fact that the pressure eventually established in the straight-air pipe 15 with the brake valve handle 48 in emergency position corresponds to the pressure as supplied from the feed valve device 12, the pressure established in the straight-air pipe 15 will be somewhat higher than the pressure established in pipe 122 and accordingly the double check valve device 123 will be operated ordinarily to establish communication from the straight-air pipe 15 to the brake cylinder pipe 124, the pressure in the pipe 122 remaining potentially in reserve however to operate the double check valve 123 to establish communication from the pipe 122 to the brake cylinder 10 in the event that, for some reason or the other, the pressure fails to build up in the straight-air pipe 15, thereby assuring the emergency application of the brakes.

In the event that either the vent valve piston 134 or the vent valve 135 stick in a position to cause lapping of the branch pipe and passage 141 it will be observed that the reduction in brake pipe pressure will continue through the exhaust port 75 at brake valve 14 by way of the passage 147, past the check valve 145, and the emergency pipe 81 so that operation of the emergency valve device 17 is insured.

It will be apparent that when the brake pipe pressure is reduced substantially to atmospheric pressure and the fluid pressure in the chambers 136 and 137 on opposite sides of the vent valve piston 134 is substantially equalized at atmospheric pressure, the spring 138 will reseat the vent valve 135 on the anular rib seat 139. In view of the fact that the charging pipe 72 remains connected to atmosphere through the exhaust port 84, the reestablishment by vent valve 135 of the charging communication betwen the charging pipe 72 and the branch pipe and passage 141 of the brake pipe does not result in recharging of the brake pipe until the brake valve handle 48 is returned to some position within the application zone in which the fluid under pressure from the feed valve pipe 27 is again supplied into the charging pipe 72 through the port 71 of the rotary valve 67.

To release the brakes following a manually effected emergency application, the operator shifts the brake valve handle 48 to release position thereby reducing the straight-air pipe pressure to atmospheric pressure and effecting the restoration of the pressure in the brake pipe to the normal pressure carried therein. Fluid under pressure is thus exhausted from the brake cylinder 10 by way of the straight-air pipe 15 and exhaust port 39 of the brake valve device 14. At the same time, the emergency valve device 17 is restored to its release position shown in the drawing wherein the fluid under pressure in the pipe 122 is released to atmosphere by way of the passage 120 and port 106 in the main slide valve 96 and the exhaust port 107.

(d) *Safety control or deadman emergency application*

Assuming that the equipment is conditioned as shown in the drawing with the brake valve handle 48 in release position, a safety control or deadman application of the brakes is effected by relieving the pressure on or releasing at foot pedal 167. With the foot pedal 167 released, fluid under pressure in safety control pipe 19 is exhausted to atmosphere past the unseated diaphragm valve 166 and through the exhaust passage and port 168. Since the pressure in the brake cylinder is at atmospheric pressure, the brakes being released, the diaphragm valve 174 of the cut-off device 22 is unseated and thus the reduction of the pressure in the safety control pipe 19 causes a corresponding reduction of the pressure in the chamber 136 above the vent valve piston 134 of the vent valve device 18. The brake pipe pressure effective in the chamber 137 below the vent valve piston 134 thus shifts the vent valve piston upwardly into seated engagement on the gasket 152 and, since the chamber 137 continues to be charged with fluid under pressure through the charging pipe 72, the vent valve piston 134 is maintained seated on the gasket 152. It will be observed that ball check valve 146 prevents flow of fluid under pressure from the emergency pipe and the brake pipe to the safety control pipe through the passage 149 upon a reduction of the pressure in the safety control pipe 19, thus insuring movement of vent valve piston 134 upwardly to unseat vent valve 135. As in the case of the manually effected emergency application of the brakes, the vent valve 135 operates to cause reduction of the pressure in the brake pipe 16 by exhaust of fluid under pressure through the exhaust port 153. At the same time, the stem 163 of the valve piston 134 shifts the check valve 156 upwardly into seated engagement on the annular rib seat 155, in which position the valve 156 cuts off communication from the pipe 161, leading to the brake cylinder 10, to the pipe 162 leading to the cut-off valve chamber 178 and establishes communication past the lower annular rib seat 157 from the cut-off valve chamber 178 to the chamber 136 and connected safety control pipe 19 which at this time is being vented to atmosphere at the foot valve device 21.

Upon the emergency reduction of brake pipe pressure effected by unseating of the valve 135 of the vent valve device 18, the emergency valve device 17 operates to cause the supply of fluid under pressure from the emergency reservoir 13 to the pipe 122 and also to effect reduction in the pressure of the brake pipe 16 substantially to atmospheric pressure. The pressure of the fluid supplied to the pipe 122 shifts the valve piston of the double check valve device 123 to establish communication from the pipe 122 to the brake cylinder pipe 124 and a pressure is thus built up in the brake cylinder corresponding to the pressure of equalization between the emergency reservoir 13 and brake cylinder 10.

With the check valve 156 of vent valve device 18 maintained in seated relation on the upper annular rib seat 155, the supply of fluid at brake cylinder pressure to the chamber 178 in the cut-off valve device 22 remains cut off and, since the safety control pipe 19 remains vented to atmosphere at the foot valve device 21, the chamber 178 remains vented to atmosphere past the lower annular rib seat 157 from which the check valve 156 is unseated.

Thus, the operation of the cut-off valve device 22, in response to the build-up of brake cylinder pressure in excess of a certain uniform degree, is suppressed or prevented in the case of a safety control or deadman emergency application of the brakes.

In order to release the brakes following a safety control or deadman emergency application of the brakes, the operator merely depresses the foot pedal 167 of the foot valve device 21. The exhaust communication for the safety control pipe 19 is thus closed and the safety control pipe is again charged to the normal pressure carried therein from the charging pipe 72 through the restricted port 130 in the vent valve piston 134. When the pressure in the chambers 136 and 137 on opposite sides of the vent valve piston 134 is substantially equalized, the spring 138 shifts the piston downwardly and causes the vent valve 135 to again seat on the annular seat rib 139 to close the exhaust port 153 and reestablish the charging communication between the charging pipe 72 and the branch pipe and passage 141 of the brake pipe to effect recharging of the brake pipe. When the brake pipe 16 is again charged to the normal pressure carried therein, the emergency valve device 17 is restored to the release position thereof shown in the drawing wherein the fluid under pressure is exhausted from the brake cylinder 10 by way of the pipe 122, passage 120 and port 106 in the main slide valve 96, and exhaust port 107, to effect the release of the brakes.

SUMMARY

Summarizing, it will be seen that I have disclosed a fluid pressure brake equipment having a cut-off valve device operative in case of a manually effected service or emergency application of the brakes to suppress or prevent a safety control or "deadman" application of the brakes when a predetermined degree of brake cylinder pressure has been attained, and including according to my invention, a novel type of vent valve device which is operatively controlled by the operator through a brake valve device or under the control of a "deadman" device to cause an emergency application of the brakes and which is effective in the case of a "deadman" application of the brakes to suppress or prevent operation of the cut-off valve device upon the attainment of a certain uniform pressure in the brake cylinder.

While I have described my invention in connection with a simplified form of brake equipment, it will be understood that various omissions, additions and modifications may be made in the equipment shown without departing from the spirit of my invention. It is not my intention therefore to limit the scope of my invention except as it is necessitated by the scope of the prior art.

Having now described my invention, what I claim as new and desire to secure by Letters Patent, is:

1. In a vehicle fluid pressure brake equipment, a brake valve device operative to effect an application of the brakes, a safety control device, a valve device controlled by the safety control device for effecting an application of the brakes, means operative in response to the pressure of fluid supplied thereto when the application of the brakes as effected by the brake valve device exceeds a certain degree for rendering the safety control device ineffective to control the said valve device, a valve normally in a position for establishing communication through which fluid under pressure is supplied to the fluid pressure operated means upon an application of the brakes, and means for shifting said valve to a position to close said communication when the said valve device is operated under the control of the safety control means to effect an application of the brakes.

2. In a vehicle fluid pressure brake equipment, a brake valve device operative to effect an application of the brakes, a safety control device, a valve device controlled by the safety control device for effecting an application of the brakes, means operative in response to the pressure of fluid supplied thereto when the application of the brakes as effected by the brake valve device exceeds a certain degree for rendering the safety control device ineffective to control the said valve device, a valve normally in a position for establishing communication through which fluid under pressure is supplied to the fluid pressure operated means upon an application of the brakes, and means for shifting said valve to a position to close said communication and establish another communication through which fluid under pressure is released from the fluid pressure operated means when the said valve device is operated under the control of the safety control means to effect an application of the brakes.

3. In a vehicle fluid pressure brake system, a brake valve device, a safety control device, a valve device operatively controlled by either the brake valve device or the safety control device for effecting an application of the brakes, means operative in response to the pressure of fluid supplied thereto when an application of the brakes as effected by the brake valve device exceeds a certain degree for rendering the safety control device ineffective to control the said valve device, and a valve normally effective to establish communication through which fluid under pressure is supplied to the fluid pressure operated means upon an application of the brakes, said valve being engaged and moved by the valve device to a position for closing said communication when the valve device is operated under the control of the safety control device to effect an application of the brakes.

4. In a vehicle fluid pressure brake system, a brake valve device, a safety control device, a valve device operatively controlled by either the brake valve device or the safety control device for effecting an application of the brakes, means operative in response to the pressure of fluid supplied thereto when an application of the brakes as effected by the brake valve device exceeds a certain degree for rendering the safety control device ineffective to control the said valve device, and a valve normally effective to establish communication through which fluid under pressure is supplied to the fluid pressure operated means upon an application of the brakes, and for shifting said valve to a position for closing said communication when said valve device is operated under the control of the safety control device to effect an application of the brakes.

5. In a vehicle fluid pressure brake system, a safety control pipe and an emergency pipe both normally charged with fluid under pressure, a valve device operated in response to a reduction of the pressure in either of said pipes for effecting an application of the brakes, means operative in response to the pressure of fluid supplied thereto when the application of the brakes as effected by the brake valve device exceeds a certain degree for preventing operation of the valve device by reduction of the pressure in the safety control pipe, and a valve normally effective to establish communication through which fluid under pressure is supplied to the fluid pressure operated means upon an application of the brakes, said valve being engaged and moved by the valve device, when operated in response to a reduction of safety control pipe pressure, to close said communication and thereby prevent operation of the fluid pressure operated means.

6. In a vehicle fluid pressure brake system, a safety control pipe and an emergency pipe both normally charged with fluid under pressure, a valve device operated in response to a reduction of the pressure in either of said pipes for effecting an application of the brakes, means operative in response to the pressure of fluid supplied thereto when the application of the brakes as effected by the brake valve device exceeds a certain degree for preventing operation of the valve device by reduction of the pressure in the safety control pipe, and a valve normally effective to establish communication through which fluid under pressure is supplied to the fluid pressure operated means upon an application of the brakes, and so constructed and arranged as to be engaged and moved by the valve device to close said supply communication and establish a communication through which fluid under pressure is released from the fluid pressure operated means when said valve device is operated in response to a reduction of pressure in the safety control pipe.

7. In a vehicle fluid pressure brake equipment, a brake valve device operative to effect an application of the brakes, a safety control device, a valve device controlled by the safety control device for effecting an application of the brakes, means operative in response to the pressure of fluid supplied thereto when the application of the brakes as effected by the brake valve device exceeds a certain degree for rendering the safety control device non-effective to control the said valve device, and a valve normally effective to establish communication through which fluid under pressure is supplied to the fluid pressure operated means upon an application of the brakes and adapted to be engaged and moved by the said valve device to close said supply communication and establish a communication through which fluid under pressure is released from the fluid pressure operated means to the safety control pipe, when the said valve device is operated in response to a reduction of the pressure in the safety control pipe to effect an application of the brakes.

8. In a vehicle fluid pressure brake system, in combination, a brake cylinder, manually operative means for causing fluid under pressure to be supplied to the brake cylinder to effect an application of the brakes, a safety control pipe normally charged with fluid under pressure, a valve device operative in response to a reduction of the pressure in the safety control pipe for also causing fluid under pressure to be supplied to the brake cylinder to effect an application of the brakes, a cut-off valve device operative from a normally open position to a closed position to prevent operation of the said valve device by reduction of the pressure in the safety control pipe, means providing a communication through which fluid at brake cylinder pressure is supplied to the cut-off valve device to effect operation thereof to close the safety control pipe when the brake cylinder pressure exceeds a certain uniform pressure, and a valve adapted to be engaged and moved by the said valve device to close said supply communication to the cut-off valve device when the said valve device operates in response to a reduction in the pressure in the safety control pipe to effect an application of the brakes.

9. In a vehicle fluid pressure brake system, in combination, a brake pipe, a safety control pipe, an emergency pipe, all of said pipes being normally charged with fluid under pressure, a valve device operative upon a reduction of the pressure in either the safety control pipe or the emergency pipe for closing communication through which said brake pipe is charged with fluid under pressure and for effecting a reduction in brake pipe pressure, and means operatively responsive to a reduction in brake pipe pressure for effecting an application of the brakes.

10. In a vehicle fluid pressure brake system, in combination, a brake pipe, a safety control pipe, an emergency pipe, a valve device effective normally to cause all of said pipes to be charged with fluid under pressure and operative upon a reduction of the pressure in either the safety control pipe or the emergency pipe to close the charging communication for the brake pipe and effect a reduction of pressure in the brake pipe, and means operatively responsive to a reduction in brake pipe pressure for effecting an application of the brakes.

11. In a vehicle fluid pressure brake system, in combination, a brake pipe, a safety control pipe, a valve device effective normally to cause said brake pipe and safety control pipe to be charged with fluid under pressure, an emergency pipe, a communication through which fluid under pressure may flow from the safety control pipe to the emergency pipe to charge said emergency pipe, a one-way valve in said communication for preventing flow of fluid under pressure from the emergency pipe to the safety control pipe, said valve device being operative upon a reduction of the pressure in the safety control pipe or in the emergency pipe to close communication through which the brake pipe is charged and for effecting a reduction in brake pipe pressure, and means operatively responsive to a reduction of the pressure in the brake pipe for effecting an application of the brakes.

12. In a vehicle fluid pressure brake system, in combination, a brake pipe, an emergency pipe, a valve device normally effective to cause said brake pipe and emergency pipe to be charged with fluid under pressure and operative upon a reduction of the pressure in the emergency pipe for closing the communication through which the brake pipe is charged and for effecting a reduction in brake pipe pressure, a communication connecting the emergency pipe to the brake pipe whereby upon a reduction of the pressure in the emergency pipe a reduction in brake pipe pressure is effected independently of operation of said valve device, and means responsive to the reduction of the pressure in the brake pipe for effecting an application of the brakes.

13. In a vehicle fluid pressure brake system, in combination, a brake pipe, an emergency pipe, a valve device normally effective to cause said brake pipe and emergency pipe to be charged with fluid under pressure and operative upon a reduction of the pressure in the emergency pipe for closing the communication through which the brake pipe is charged and for effecting a reduction in brake pipe pressure, a communication connecting the emergency pipe to the brake pipe whereby upon a reduction of the pressure in the emergency pipe a reduction in brake pipe pressure is effected independently of operation of said valve device, a one-way valve in said communication for preventing flow of fluid under pressure from the emergency pipe to the brake pipe, and means responsive to reduction of the pressure in the brake pipe for effecting an application of the brakes.

14. In a vehicle fluid pressure brake system, in combination, a brake pipe, a safety control pipe, a charging pipe, an emergency pipe, a vent valve device having a valve and a piston for operating said valve, said piston being subject on one side to the pressure in the safety control pipe and on the opposite side to the pressure in the charging pipe and adapted when the pressures on opposite sides of the piston are equalized to operate the said valve to establish communication between the charging pipe and the said brake pipe to effect charging of the brake pipe, means providing a communication between the safety control pipe and the emergency pipe, a one-way valve in said communication for preventing flow of fluid under pressure from the emergency pipe to the safety control pipe, means providing a second communication between the emergency pipe and the brake pipe, a one-way valve in said second communication for preventing flow of fluid under pressure from the emergency pipe to said brake pipe, the piston of the said vent valve device being operated in response to a reduction of the pressure in the safety control pipe or in the emergency pipe to shift the valve of the vent valve device to cut off communication between the charging pipe and the brake pipe and establish communication from the brake pipe to atmosphere, and means responsive to the reduction of pressure in the brake pipe for effecting an application of the brakes, said second communication connecting the emergency pipe and the brake pipe being effective to enable reduction of brake pipe pressure upon reduction in emergency pipe pressure independently of operation of the said vent valve device, the one-way valve in said second communication being effective to prevent flow of fluid under pressure from the safety control pipe to the brake pipe by way of the first said communication upon charging of the safety control pipe and the one-way valve in the first said communication being effective to prevent reduction of brake pipe pressure by way of said second communication upon reduction of the pressure in the safety control pipe.

JOHN N. GOOD.